United States Patent [19]
McClory

[11] 3,926,815
[45] Dec. 16, 1975

[54] READILY ATTACHABLE WATER FILTER WITH CUTOFF VALVE

[75] Inventor: Robert M. McClory, Los Angeles, Calif.

[73] Assignee: Aqua-Chem, Inc., Milwaukee, Wis.

[22] Filed: Feb. 19, 1975

[21] Appl. No.: 550,999

Related U.S. Application Data

[63] Continuation of Ser. No. 402,291, Oct. 1, 1973, abandoned.

[52] U.S. Cl. ............ 210/424; 137/625.22; 210/444; 251/309; 285/419
[51] Int. Cl.² .................. B01D 35/02; B01D 29/42
[58] Field of Search..... 137/625.22, 625.46, 625.47; 210/133, 135, 137, 278, 288, 418, 424, 440, 443, 444; 251/309; 285/373, 419

[56] References Cited
UNITED STATES PATENTS

| | | | |
|---|---|---|---|
| 1,928,570 | 9/1933 | Mustico | 285/373 X |
| 2,146,067 | 2/1939 | Graham | 285/373 |
| 2,868,176 | 1/1959 | Bennett | 137/625.22 |
| 2,966,990 | 1/1961 | Sicard | 210/443 |
| 3,653,514 | 4/1972 | Holler et al. | 210/424 X |
| 3,678,960 | 7/1972 | Leibinsohn | 251/309 X |
| 3,684,100 | 8/1972 | Close | 210/444 |
| 3,741,394 | 6/1973 | Defenbaugh | 210/424 X |
| 3,777,889 | 12/1973 | Henderson | 210/135 |
| 3,799,499 | 3/1974 | Shur | 251/309 X |

*Primary Examiner*—Thomas G. Wyse
*Assistant Examiner*—Robert H. Spitzer
*Attorney, Agent, or Firm*—Fred Wiviott; Ralph G. Hohenfeldt

[57] ABSTRACT

A water filter unit for rapid installation in an existing water supply pipe. The unit includes a filter mounting block having internal conduits for directing water from a manifold on one face of the block through a filter housing containing a filter cartridge mounted on the opposite face of the block. Severed ends of the existing water pipe are brought into abutting relationship with the manifold and sealed thereto by a suitable cover. The filter mounting block includes a valve for shutting off the internal conduits so that the filter housing may be removed to enable filter cartridge replacement. Sealing means are provided for adapting the unit to different pipe sizes.

5 Claims, 3 Drawing Figures

READILY ATTACHABLE WATER FILTER WITH CUTOFF VALVE

This is a continuation of application Ser. No. 402,291, filed Oct. 1, 1973, now abandoned.

BACKGROUND OF THE INVENTION

This invention relates to a filter for a water supply such as may be installed in a residential dwelling. Many prior art water supply filters have replaceable filter cartridges, often constructed of activated charcoal. For the most part, cartridge replacement has necessitated turning off the main water supply with valves installed in the water pipe between the filter unit and the main water supply. In addition, with such external valves it has been necessary to bleed the pressure prior to opening the housing which contains the filter cartridge. The installation of such home filters, therefore usually requires plumbing skill since valves, couplings, pipe unions and other fittings must be installed and pipe threads must be cut or joints must be soldered.

SUMMARY OF THE INVENTION

It is a primary object of this invention to provide a water filter assembly which may be installed in a fast and simple manner without the need for cutting pipe threads or soldering.

It is another object of this invention to provide a water filter assembly which permits filter cartridge removal and replacement without shutting off the main water supply.

It is yet another object of the invention to provide a water filter assembly which is readily adaptable to the numerous types of water filters which are currently on the market.

It is still a further object of the invention to provide a water filter assembly which is easily adapted by the installer for use in various sizes of existing water pipes.

How these and other more specific objects are accomplished will appear from time to time throughout the following more detailed description of a preferred embodiment of the invention taken in conjunction with the drawings. Generally, the new filter includes a trough member mounted on one face of a filter mounting block, the trough including a manifold adapted to span a gap created between severed ends of an existing water pipe. Channels within the block direct water from the manifold to a filter cartridge contained within a housing mounted on the opposite face of the block. Pliable seals are slipped over the spaced apart severed pipe ends. A suitable cover is clamped over the severed pipe ends and the manifold. The assembly may further include a multi-position cut-off valve, preferably within the filter mounting block for shutting of water flow to the filter cartridge and for by-passing the filter.

DESCRIPTION OF A PREFERRED EMBODIMENT

Figure 1:
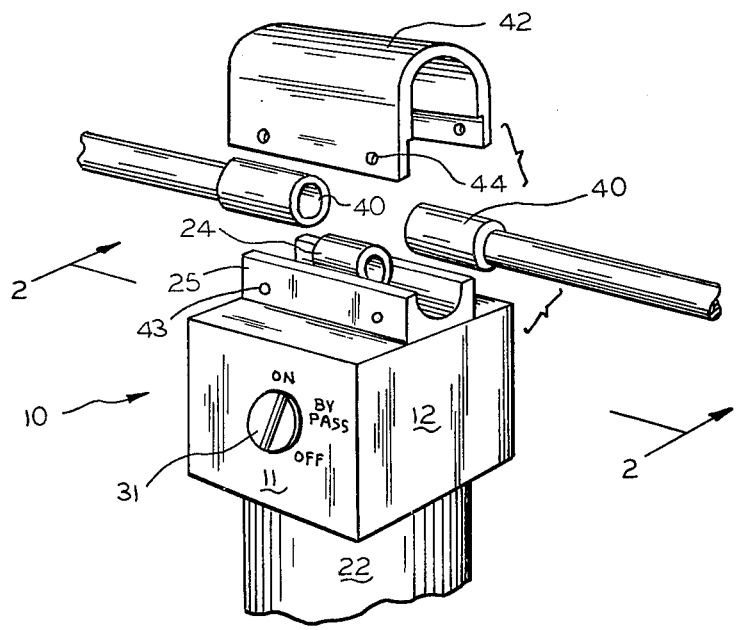
FIG. 1 is an exploded elevation view showing the parts of the new filter unit, some parts being shown fragmentarily.
Figure 2:
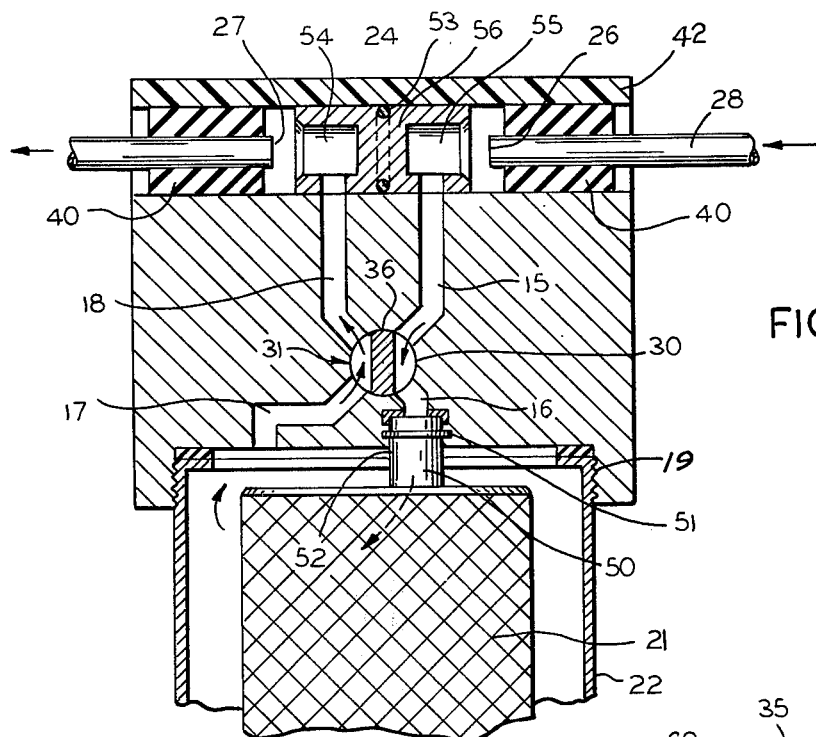
FIG. 2 is a vertical cross-sectional view of the new filter unit taken on a plane corresponding with 2—2 in FIG. 1 and showing a valve for controlling the main water supply to the filter cartridge housing.

In FIGS. 1 and 2 the new filter unit is generally designated by the number 10. These figures show it to include a filter mounting block 12 having internal conduits 15–18 therein. Mounted on the upper or top face of filter mounting block 12 is a manifold fitting 24 which has an inlet communicating with conduit 15 and an outlet communicating with conduit 18. A housing 22 is coupled to the bottom face of the filter mounting block 12, the housing 22 communicating with conduits 16 and 17. A rotary valve 31 may be provided intermediate the manifold 24 and the housing 22 for selectively routing water in different paths through the unit.

Filter mounting block 12 is a generally cube shaped member which may be constructed of any suitable material such as metal of thermosetting resin. The four generally tubular conduits 15–18 with filter mounting block 12 are substantially coplanar. Two of the conduits, 15 and 18, lead from the top face of filter mounting block 12 to a cylindrical valve chamber 30 located at the center of the filter mounting block 12. The other two conduits, 16 and 17, lead from chamber 30 to the bottom face of filter mounting block 12. The flow path of water through these conduits and the valve chamber will be discussed shortly hereinafter.

A generally cup-shaped housing 22 is attached to the bottom face of block 12, by, fo example, thread 19. housing 22 contains a cylindrical filter element 21. Conduit 16 and 17 are arranged so that the filter element 21 is disposed between them. In the illustrated unit of FIG. 2, unfiltered water conduit 16 opens into the center of housing 22, and filtered water exit conduit 17 opens at the periphery. The filter 21 has a tubular inlet 50 surrounded by an O-ring 51 which serves as a seal where inlet 50 enters a counterbored hole 52 in block 12. Filter 21 is secured against slipping downward by the closed bottom end, not shown, of cup 22. The particular construction of the filter element 21 is not shown in detail since a variety of suitable filters are known.

On the opposite or top face of filter block 12, conduits 15 and 18 terminate near manifold 24 which is mounted within a generally U-shaped trough 25 which extends across filter mounting block 12. The manifold has an O-ring seal 53 and cavities 54 and 55 separated by a wall 56. Conduits 15 and 18 connect with manifold 24 and cavities 55 and 54 respectively. Sufficient space is provided between the terminal ends of manifold 24 and the edges of trough 25 to accommodate the ends 26 and 27 of water pipe 28. As best seen in FIG. 2, end 26 of pipe 28 communicates with manifold 24 and thereby joins conduit 15. End 27 of pipe 28 communicates with the opposite end of manifold 24 and thereby joints conduit 18. The gap between the ends of pipe sections 28 can be made easily by making two cuts in an existing water pipe with a saw or pipe cutter. The pipe ends need not be threaded in accordance with the invention.

Ends 26 and 27 of pipe 28 are encased in cylindrical packaging rings or seals 40 which may be made of rubber or other suitable pliable material. The packing rings are designed to be compressed to approximately equal cross-sectional area and conformation to the generally U-shaped trough member 25. An inverted generally U-shaped cover means 42 is used to seal ends 26 and 27 having the packing rings to the manifold 24. The cover 42 overlaps trough member 25 and is secured thereto by inserting a suitable securing device, such as a bolt or screw, through mating holes 43 and 44 on the trough 25 and cover 42 respectively. Packing rings 40 enable connecting the filter assembly 10 to vaious pipe 28 sizes. The rings are made available with a constant external diameter and with a variety of internal diameters which correspond with standard pipe and tubing nominal sizes. Hence, the installer selects packing rings 40 which fit snuggly on whatever size water pipe the filter is to be installed.

Figure 3:
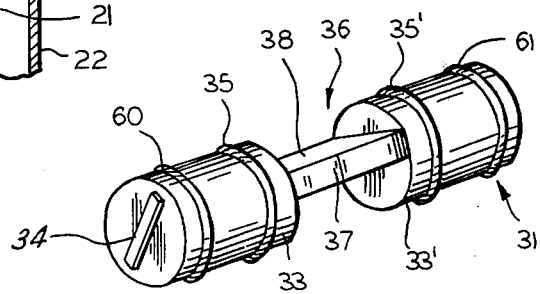
FIG. 3 is an elevation view of the valve member isolated from the filter unit illustrated in FIGS. 1 and 2.

For purposes of describing the operation of valve 31 and the flow of water through the filter unit, it will be assumed that impure water enters the filter through conduit 15. Conduits 15–18 each enter a cylindrically shaped valve chamber 30 located in the center of the filter mounting block 12 and aligned perpendicularly to the plane of the conduits, and also aligned so that the axis of the cylinder is perpendicular to face 11 of filter block 12. The length of cylindrical chamber 30 need be no greater than the diameter of conduits 15–18, which conduits enter chamber 30 at approximately 90° angles with respect to each other in this example. A rotary valve member 31 which serves primarily as a partitioning means is inserted through face 11 of filter mounting block 12. Valve member 31 is generally cylindrical as illustrated in FIG. 3, and includes two cylindrical portions 33 and 33' which are inserted through face 11 of filter mounting block 12. A slot 34 may be provided in the outer end valve member 31 to allow for rotation of the member 31 by an instrument such as a screwdriver or coin. Water leakage axially of the cylindrical bodies 33 and 33' is prevented by the use of O-rings 35 and 35' or other suitable sealing means. The central portion of valve member 31 is designed for selectively regulating flow through said chamber 30 and is an axially extending web 36 connecting bodies 33 and 33'. The radial faces 37 of web 36 are convex or circular and mate with the circular internal walls of chambers 30. The sides 38 of web 36 may be smoothly concave to serve as water deflectors and reduce flow friction. The cylindrical portions 33 and 33' each have grooves 60 and 61, respectively for accommodating a C-type snap ring, not sown. The snap rings are installed in cylindrical portions 33 and 33' so as to engage opposite faces of block 12 and thereby prevent inadvertent withdrawal of rotary valves 31.

FIG. 1 indicates three selectable angular positions for rotary valve member 31. First, when the partition web 36 is in a vertical position as illustrated in the figures, the web directs feed water from entry conduit 15 to conduit 16 and into filter 21 and directs returned filtered water from conduit 17 to exit conduit 18. It can be readily understood that clockwise rotation of the valve member 31 by 45° would bring the convex ends 37 of web 36 over conduit 15 and conduit 17, thus stopping all water flow through the valve chamber 30. The final position would result from a further clockwise rotation of valve member 31 and its central web 36 by another 45° in which case water from entry conduit 15 would flow directly to exit conduit 18.

The filter unit functions in the following manner. When a unit is assembled and the main water supply turned on, water will flow from feed pipe 28 through the cavity 55 in manifold 24 and through conduit 15 to the vicinity of valve chamber 30. Depending on the angular position of valve member 31, flow will then either be to the filter housing 22, to conduit 18 or be stopped altogether if the valve 31 is in the "off" position.

Housing 22 may be unscrewed and removed whenever the valve member 31 is in either the "off" of the "by-pass" position. It is advantageous, however, to have the capability of choosing these positions. The "by-pass" position may be used to preclude filtering when there is no demand for filtered water so as to increase filter cartridge life. However, some installations might not be able to tolerate unfiltered "by-pass" water at any time in which case it would be essential to stop all water flow while changing a filter by turning the valve 31 to the "off" position. Another important feature of the new filter is that it is readily adaptable to different sizes of the existing water supply pipes merely by selecting packing rings 40 of the proper internal diameter as was discussed earlier. The existing water lines do not have to be sprung out of alignment to insert the filter. It will be obvious that other means could be used to connect trough cover 42 to the trough 25, such as with flanges not shown, at the bottom of cover 42 and screwing or bolting the flanges directly onto the upper face of filter mounting block 14. Other types of multiway valves could be used in place of valve member 31 shown in FIG. 3. It should also be obvious to one skilled in the art that the particular arrangement of conduits 15 and 18 within the interior of filter mounting block 12 is subject to modification. Accordingly, the invention is not to be limited by the foregoing description of a preferred embodiment, but is to be limited only by the claims which follow.

I claim:

1. A fluid filtering system comprising:
    a filter housing including a filter means,
    a mounting block coupled to said filter housing, said mounting block including conduit means for directing supply fluid to said filter means and for directing filtered fluid from said filter means,
    elongate trough means disposed on said mounting block, said trough means being generally semi-circular in cross-section,
    generally tubular supply pipe sealing means disposed at one end of said trough means,
    generally tubular filtered fluid exhaust pipe sealing means disposed at the opposite end of said trough means,
    manifold means disposed intermediate said pipe sealing means, said manifold means including an inlet coupling said supply pipe sealing means and said supply fluid conduit means of said mounting block and an outlet coupling said exhaust pipe sealing means and said filtered fluid conduit means of said mounting block,
    means within said manifold means for preventing fluid flow from said manifold inlet to said manifold outlet other than through said conduit means, and
    cover means for said trough means which when attached to said trough means forms a leakproof seal around said supply and exhaust pipe sealing means and said manifold means.

2. The invention set forth in claim 1 wherein said supply pipe and exhaust pipe sealing means comprise deformable sealing means adapted for surrounding adjacent ends of fluid supply and fluid exhaust pipe means, the outer surface of said sealing means conforming to the surfaces of said trough means and said cover means whereby said sealing means is subject to compressive deformation by said cover means and said trough means for forming said leakproof seal around supply and exhaust pipe means received therein.

3. The invention set forth in claim 1 and including valve means within said body means and coupled to both said conduit means for selectively permitting fluid flow from said manifold inlet to said manifold outlet other then through said filter means.

4. The invention set forth in claim 3 wherein said valve means is adapted for selectively preventing fluid flow from said manifold inlet to either said filter means or said manifold outlet.

5. A fluid filter assembly for installation between substantially coaxial ends of spaced apart fluid conducting pipe means comprising:
- a. body means having a bore therein,
- b. clamping means constructed and arranged for engaging a first external portion of said body to define an elongate space between said clamping means and said body means,
- c. means within said space for partitioning said space into fluid inlet and outlet cavities and for connecting said cavities to the interior of said body means,
- d. a chamber connected to a second external portion of said body means accommodating a fluid filter medium, said chamber having an inlet and an outlet communicating with the interior of said body means,
- e. conduit means within said body means for enabling fluid communication between said inlet cavity and said chamber inlet and between said chamber outlet and said outlet cavity; and
- f. valve means rotatable in said bore of said body means and connected to said conduit means for selectively permitting fluid communication from said inlet cavity to said outlet cavity other than through said chamber and for selectively preventing fluid communication from said inlet cavity to either of said chamber inlet or said outlet cavity, conduits coupling each of said inlet and outlet cavities and said chamber inlet and outlet to said bore, and said valve including a member rotatable in said bore having passageways which are rotatable therewith to establish registry between selected ones of said conduit means, said valve member comprising axially spaced apart substantially cylindrical portions and a web means connecting said portions, said web means having a width less then the diameter of said portions and a height substantially equal to the diameter of said portions.

* * * * *